US011860325B2

(12) United States Patent
Shaikh

(10) Patent No.: US 11,860,325 B2
(45) Date of Patent: Jan. 2, 2024

(54) DEEP LEARNING ARCHITECTURE FOR SEISMIC POST-STACK INVERSION

(71) Applicant: SAUDI ARABIAN OIL COMPANY, Dhahran (SA)

(72) Inventor: Obai Nabeel Malik Shaikh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/538,759

(22) Filed: Nov. 30, 2021

(65) Prior Publication Data
US 2023/0168405 A1    Jun. 1, 2023

(51) Int. Cl.
G01V 1/30 (2006.01)
E21B 47/14 (2006.01)
(Continued)

(52) U.S. Cl.
CPC .............. G01V 1/306 (2013.01); E21B 47/14 (2013.01); G01V 1/50 (2013.01); G06N 3/08 (2013.01);
(Continued)

(58) Field of Classification Search
CPC .. G01V 1/306; G01V 1/50; G01V 2210/6226; E21B 47/14; E21B 2200/22; G06N 3/08
See application file for complete search history.

(56) References Cited

U.S. PATENT DOCUMENTS 7,184,367 B2   2/2007 Yin
7,719,923 B2   5/2010 Volterrani
(Continued)

FOREIGN PATENT DOCUMENTS

CN   109143356 A      1/2019
CN   112114362 A  *  12/2020  ............. G01V 1/307
(Continued)

OTHER PUBLICATIONS

G. Kanojia and et al, "Exploring Temporal Differences in 3D Convolutional Neural Networks", Computer Vision and Pattern Recognition, Cornell University, arXiv:1909.03309, 2019 (Year: 2019).*
(Continued)

Primary Examiner — Douglas Kay
(74) Attorney, Agent, or Firm — Osha Bergman Watanabe & Burton LLP

(57) ABSTRACT

A system for estimating a rock property away from a well may include one or more hardware processors configured to access acquired three-dimensional (3D) seismic data that includes seismic traces from a 3D seismic survey of an area of interest. The system may also include a multi-head Convolutional Neural Network (CNN) model. The multi-head CNN model may include a plurality of kernels of various sizes for determining spatial and temporal relationships of the captured 3D seismic data at different resolutions. The multi-head CNN model may be trained to generate an estimated rock property value of a formation zone included in the area of interest, away from the well. The one or more hardware processors are further configured to update a drilling program for a production system based on the estimated rock property value. The drilling program may be executed on a computing device of the production system.

15 Claims, 10 Drawing Sheets

(51) Int. Cl.
*G01V 1/50* (2006.01)
*G06N 3/08* (2023.01)

(52) U.S. Cl.
CPC .. *E21B 2200/22* (2020.05); *G01V 2210/6226* (2013.01)

(56) References Cited

U.S. PATENT DOCUMENTS

| | | | |
|---|---|---|---|
| 9,223,041 | B2 | 12/2015 | Wendt et al. |
| 11,313,994 | B2* | 4/2022 | Salman ................ G06N 20/00 |
| 2017/0075000 | A1* | 3/2017 | Dusterhoft .............. G01V 1/42 |
| 2017/0212275 | A1* | 7/2017 | Skelt ...................... G01V 99/00 |
| 2018/0217285 | A1* | 8/2018 | Walters ................... G01V 1/42 |
| 2019/0257968 | A1* | 8/2019 | Qiu ......................... G01V 1/22 |
| 2020/0096660 | A1 | 3/2020 | Eckersley et al. |
| 2020/0278468 | A1* | 9/2020 | Zhang ..................... G01V 1/50 |
| 2021/0125312 | A1* | 4/2021 | Mulchandani ......... G06N 3/084 |
| 2021/0264262 | A1* | 8/2021 | Colombo ............... G01V 1/282 |
| 2022/0129788 | A1* | 4/2022 | Zhang .................... E21B 49/00 |
| 2022/0187493 | A1* | 6/2022 | Smith ..................... E21B 45/00 |
| 2022/0307365 | A1* | 9/2022 | Al-Abduljabbar ...... E21B 44/02 |

FOREIGN PATENT DOCUMENTS

| | | |
|---|---|---|
| CN | 112114362 A | 12/2020 |
| CN | 112733449 A | 4/2021 |

OTHER PUBLICATIONS

C. Sopegno, "Graph neural networks for classification: models and applications", Politecnico di Torino, Mathematical Engineering, Master Thesis, 2020 (Year: 2020).*

K. Zhu and et al., "A Comparative Study of Five Networks for Reservoir Classification Based on Geophysical Logging Signals", IEEE Access, vol. 8, 2020 (Year: 2020).*

M. Zhou and et al, "Multi-resolution networks for ship detection in infrared remote sensing images", Infrared Physics & Technology vol. 92, Aug. 2018, pp. 183-189 (Year: 2018).*

Vishal Das et al., "Convolutional neural network for seismic impedance inversion" Geophysics, 84(6), pp. R869-R880, 2019 (12 pages).

Xu Zhou et al., "Data Driven Modeling and Prediction for Reservoir Characterization Using Seismic Attribute Analyses and Big Data Analytics", Society of Petroleum Engineers, 2019 (12 pages).

Tobi Micheal Ore, "A Machine Learning and Data-Driven Prediction and Inversion of Reservoir Brittleness from Geophysical Logs and Seismic Signals: A Case Study in Southwest Pennsylvania, Central Appalachian Basin", West Virginia University, 2020 (95 pages).

Yuqing Wang et al., "Well-Logging Constrained Seismic Inversion Based on Closed-Loop Convolutional Neural Network", IEEE Transactions on Geoscience and Remote Sensing, 2020 (11 pages).

Aamer AlHakeem, "3D seismic attribute analysis and machine learning for reservoir characterization in Taranaki Basin, New Zealand" Missouri University of Science and Technology, 2018 (118 pages).

Fabian Pedregosa et al., "Scikit-learn: Machine Learning in Python", pp. 2825-2830, 2011 (6 pages).

Lars Buitinck et al., "API design for machine learning software: experiences from the scikit-learn project" (15 pages), added publication date 2013 per LIE request /DK/ Jun. 15, 2023.

International Search Report issued in PCT/US2022/051413 dated Mar. 16, 2023 (3 pages).

Written Opinion of the International Searching Authority issued in PCT/US2022/051413 dated Mar. 16, 2023 (9 pages).

* cited by examiner

DEEP LEARNING ARCHITECTURE FOR
SEISMIC POST-STACK INVERSION

BACKGROUND

In geophysics, seismic inversion is the process of transforming seismic reflection data into a quantitative rock-property description of a reservoir. Seismic inversion may be pre- or post-stack, deterministic, random, or geostatistical. It typically includes other reservoir measurements such as well logs and cores. Seismic data may be inspected and interpreted on its own without inversion, but this does not provide the most detailed view of the subsurface and can be misleading under certain conditions. Because of its efficiency and quality, many oil and gas companies now use seismic inversion to increase the resolution and reliability of the data, and to improve estimation of rock properties including porosity and net pay.

Conventional seismic inversion methods require inputting large amounts of seismic data, well logs, interpreted horizons, and well directional surveys to produce an earth model. Often, the traditional seismic inversion methods are based on human assumptions about unknown parameters. Therefore, the generation of an earth model using conventional seismic inversion method may require a significant amount of time and is often susceptible to human error.

Accordingly, there is a need for a system that utilizes a data-driven, deep learning model for reading and capturing spatial and temporal relationships of input seismic data at different resolutions to more accurately predict parameters for formation zones that are located away from drilled wells.

SUMMARY

This summary is provided to introduce concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system for estimating a rock property away from a well. The system includes one or more hardware processors configured to access acquired three-dimensional (3D) seismic data that includes seismic traces from a 3D seismic survey of an area of interest. The system includes a multi-head Convolutional Neural Network (CNN) model. The multi-head CNN model includes a plurality of kernels of various sizes for determining spatial and temporal relationships of the captured 3D seismic data at different resolutions. The multi-head CNN model is trained to generate an estimated rock property value of a formation zone included in the area of interest, away from the well. The one or more hardware processors are further configured to update a drilling program for a production system based on the estimated rock property value. The drilling program may be executed on a computing device of the production system.

In general, in one aspect, embodiments disclosed herein relate to a method for estimating a rock property away from a well. The method includes accessing acquired three-dimensional (3D) seismic data that includes seismic traces from a 3D seismic survey of an area of interest. The method includes generating an estimated rock property value of a formation zone included in the area of interest, away from the well. The generating is performed using one or more hardware processors, the acquired 3D seismic data, and a trained multi-head Convolutional Neural Network (CNN) model. The trained multi-head CNN model includes a plurality of kernels of various sizes for determining spatial and temporal relationships of the captured 3D seismic data at different resolutions. The method includes updating a drilling program for a production system based on the estimated rock property value.

In general, in one aspect, embodiments disclosed herein relate to a method for training a multi-head Convolutional Neural Network (CNN) model to estimate a rock property away from a well. The method includes accessing synthetic seismic data in a training dataset used for training the multi-head CNN model. The method includes accessing rock property log data associated with the well. The method includes training the multi-head CNN model to determine one or more relationships between the synthetic seismic data and the rock property log data, and to output an estimated rock property value for a formation zone away from the well based on the one or more relationships between the synthetic seismic data and the rock property log data.

Other aspects and advantages of the claimed subject matter will be apparent from the following description and the appended claims.

BRIEF DESCRIPTION OF DRAWINGS

Some embodiments are illustrated by way of example and not limitation in the figures of the accompanying drawings.

DETAILED DESCRIPTION

Figure 1:
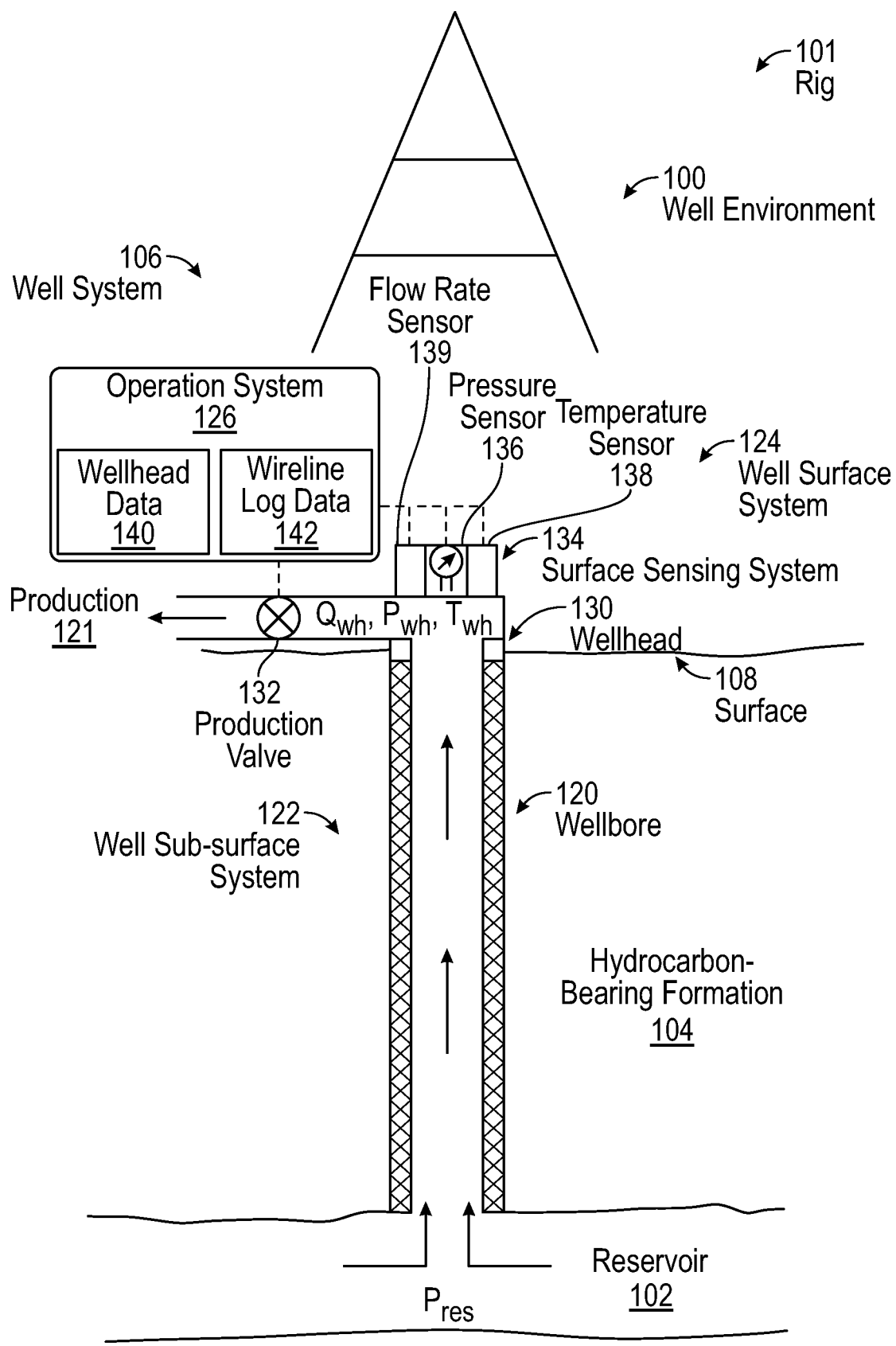
FIG. 1 illustrates a system, according to one or more example embodiments.

Example systems and methods for estimating a rock property away from a well are described. Unless explicitly stated otherwise, components and functions are optional and may be combined or subdivided. Similarly, operations may be combined or subdivided, and their sequence may vary.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, or third) may be used as an adjective for an element (that is, any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

When performing hydrocarbon exploration work in frontier areas where no wells have been drilled, it is important to understand the subsurface rock properties of the areas considered for drilling. Conventional software that performs "seismic inversion" to determine rock properties from seismic data collected from the areas of interest may take months to generate a feasible earth model.

According to one or more example embodiments, a data-driven, deep learning model may be used to capture spatial and temporal relationships of input seismic data at different resolutions (or frequencies) in order to accurately and rapidly predict physical parameters for formation zones situated away from already drilled wells. In some instances, the turnaround time for generating earth property models from seismic data may be only a few hours.

The data-driven, deep learning model may predict wireline log properties (e.g., acoustic impedance, porosity, gamma ray, etc.) from stacked seismic traces collected away from drilled wells but within a three-dimensional (3D) seismic survey boundary. This allows to combine the best traits of two types of data: (1) the lateral extent of 3D seismic surveys, and (2) the high vertical resolution of wireline logs.

In some example embodiments, a system may estimate a rock property that affects normal-incidence wave propagation (e.g., acoustic impedance, p-wave velocity, or bulk density), away from a well. The system may include one or more hardware processors configured to access acquired 3D seismic data that includes seismic traces from a 3D seismic survey of an area of interest. A seismic trace represents the response of the elastic wavefield to velocity and density contrasts across interfaces of layers of rock or sediments as energy travels from a source through the subsurface to a receiver or receiver array.

The system may also include a multi-head Convolutional Neural Network (CNN) model with a plurality of kernels of different sizes for determining spatial and temporal relationships of the captured 3D seismic data at different resolutions. The multi-head CNN model (hereinafter also "CNN model") is trained to generate an estimated rock property (e.g., an estimated acoustic impedance value) of a formation zone, away from the well. The one or more hardware processors are further configured to update a drilling program for a production system based on the estimated rock property value. For example, the drilling program may be updated with instructions to proceed drilling in the area of interest based on the estimated rock property value.

A multi-head CNN model is trained to capture the relationship between wireline logs collected from drilled wells and synthetic (hereinafter also "simulated") seismic traces generated from the wireline logs, at multiple resolutions, under the premise that the simulated seismic traces should be very similar to recorded traces of a 3D seismic survey that encloses an area of interest. In preparing the dataset for training the multi-head CNN model, each pair of a synthetic seismic trace and a desired wireline log property is treated as one training example (e.g., pair X-Y). For example, if the rock property to be predicted, based on a synthetic seismic trace, is an acoustic impedance value, then the acoustic impedance value is referred to as the target (or label) Y a training dataset, while the synthetic seismic trace is referred to as input X in the training dataset.

Given the known subsurface rock properties from the wireline logs, a processor may simulate a wave propagating through a formation zone and may generate one-dimensional synthetic seismic traces in the time domain. Hence, when the processor trains the multi-head CNN model using the synthetic seismic traces as input X, paired with a rock property log labeled Y (e.g., the acoustic impedance value), the processor teaches the multi-head CNN model the physical relationship between the rock property Y of the formation zone and the seismic response X of the formation zone. In some example embodiments, during training, data from the training dataset is input into the multi-head CNN model in batches of thirty-two training examples at each iteration. Training may be complete after two thousand epochs, where an epoch is one pass through the training dataset.

In certain example embodiments, the wireline logs are saved in binary files of the LASer format (hereinafter also "LAS files"). The LAS files of the wells within the 3D seismic coverage are randomly split into a training dataset (hereinafter also "training set") and a testing dataset (hereinafter also "testing set"). The training set may contain eighty percent of the wireline logs associated with the wells and the test set may contain the remaining twenty percent of the wireline logs associated with the wells. The training set is used to train the multi-head CNN model, while the testing set is reserved for the evaluation of the performance of the trained multi-head CNN model.

Hyperparameters refer to adjustable network parameters which control the training process, such as the number of neurons, kernel size, strides, batch size, etc. The hyperparameters are non-trainable, meaning they must be defined before training starts and remain fixed during training. The hyperparameters may be tuned until certain desired values are reached.

In some example embodiments, the multi-head CNN model features 40,641 trainable parameters (weights) and 640 non-trainable parameters, totaling 41,281 parameters. The system may use the adaptive moment estimation method (ADAM) as an optimization algorithm to iteratively update the trainable parameters of the multi-head CNN model in order to minimize the loss function. In some instances, the loss function is the mean squared error (MSE) between the label Y (e.g., the acoustic impedance log) and the multi-head CNN model's prediction.

In various example embodiments, training of the multi-head CNN model is complete once the loss function (MSE) has dropped below an error threshold value. During training, after each optimization iteration, the MSE of predictions drawn from the training set (which acts as a penalty to update the network weights) is computed, while monitoring the MSE of predictions drawn from the test (blind) set. The test set MSE is not quantitatively incorporated in the optimization process, hence the network remains "blind" to the test set. The second use of the test set occurs once the training process is complete, where the MSE of the test set should be equal to or slightly larger than that of the training set. Otherwise, if the test set MSE is significantly larger or even lower than the train set MSE, this can flag possible issues in the input data processing or the choice of the network hyperparameters. For example, if the network scores low MSE on the train set and much higher MSE on the test set, this can be an indication of overfitting on the train set (i.e., the network became too good at predicting examples from the train set, to a degree that it fails to generalize to the blind set). Further, the predictive performance of the network is assessed by computing the Pearson correlation coefficient between test set predictions and the true Y labels. If the blind prediction results are satisfactory, the process can transition to the next step. However, if the blind prediction results are not satisfactory, more hyperparameter tuning or generating more training examples should be performed.

Once trained, the multi-head CNN model accesses actual seismic traces from a 3D survey of an area of interest as input (X) to generate predictions of reservoir properties away from the drilled wells situated within the boundaries of the 3D survey of the area of interest.

The system for estimating a rock property away from a well provides a number of benefits when compared to conventional methods of seismic inversion. Further, unlike the traditional seismic inversion methods, the system uses a data-driven algorithm that uses a combination of measured and derived data and avoids building a model based on assumptions about unknown parameters. In addition, the system provides a significant reduction in the prediction turnaround time (from months to a few hours).

Another advantage of the system is the use of a larger, multi-head CNN model that includes a plurality of kernels of various sizes capable of reading the input seismic traces at multiple resolutions without harming the computation speed. This enables the CNN model to capture high and low frequency variations in the seismic data. Moreover, unlike the traditional seismic inversion methods, which require inputs of seismic data, well logs, interpreted horizons, well directional surveys, etc. to produce an earth model, the multi-head CNN model, once trained, utilizes only one type of input (seismic traces) to produce an earth property model.

Predicting rock properties, regardless of the type of property, may be useful in a wide range of applications. For instance, predicting acoustic impedance provides an indicator of the quality of a reservoir (where low impedance correlates with good reservoir quality, and vice versa), additional subsurface structural details, and a "quick look" assessment of the subsurface rock properties and structures, which could be very useful in hydrocarbon exploration.

Moreover, the system may generate velocity predictions as an input for seismic data processing stages. In addition, the system may generate bulk density predictions at wells with missing density logs but under 3D seismic coverage.

FIG. 1 shows a schematic diagram of a system, in accordance with one or more embodiments. FIG. 1 illustrates a well environment 100 that includes a hydrocarbon reservoir ("reservoir") 102 located in a subsurface hydrocarbon-bearing formation ("formation") 104 and a well system 106. The hydrocarbon-bearing formation 104 may include a porous or fractured rock formation that resides underground, beneath the earth's surface ("surface") 108. In the case of the well system 106 being a hydrocarbon well, the reservoir 102 may include a portion of the hydrocarbon-bearing formation 104. The hydrocarbon-bearing formation 104 and the reservoir 102 may include different layers of rock having varying characteristics, such as varying degrees of permeability, porosity, capillary pressure, and resistivity. In the case of the well system 106 being operated as a production well, the well system 106 may facilitate the extraction (or "production") of hydrocarbons from the reservoir 102.

In some embodiments disclosed herein, the well system 106 includes a rig 101, a wellbore 120, a well sub-surface system 122, a well surface system 124, and an operation system 126. The operation system 126 may control various operations of the well system 106, such as well production operations, well completion operations, well maintenance operations, and reservoir monitoring, assessment, and development operations. In some embodiments, the operation system 126 includes a computer system that is the same as or similar to computing system 1000 described below in FIG. 10, and the accompanying description.

The rig 101 is the machine used to drill a borehole to form the wellbore 120. Major components of the rig 101 include the mud tanks, the mud pumps, the derrick or mast, the drawworks, the rotary table or top drive, the drillstring, the power generation equipment, and auxiliary equipment.

The wellbore 120 includes a bored hole (i.e., borehole) that extends from the surface 108 into a target zone of the hydrocarbon-bearing formation 104, such as the reservoir 102. An upper end of the wellbore 120, terminating at or near the surface 108, may be referred to as the "up-hole" end of the wellbore 120, and a lower end of the wellbore, terminating in the hydrocarbon-bearing formation 104, may be referred to as the "downhole" end of the wellbore 120. The wellbore 120 may facilitate the circulation of drilling fluids during drilling operations, the flow of hydrocarbon production ("production") 121 (e.g., oil, gas, or both) from the reservoir 102 to the surface 108 during production operations, the injection of substances (e.g., water) into the hydrocarbon-bearing formation 104 or the reservoir 102 during injection operations, or the communication of monitoring devices (e.g., logging tools) into the hydrocarbon-bearing formation 104 or the reservoir 102 during monitoring operations (e.g., during in situ logging operations).

In some embodiments, during operation of the well system 106, the operation system 126 collects and records wellhead data 140 for the well system 106. The wellhead data 140 may include, for example, a record of measurements of wellhead pressure values (P w n) (e.g., including flowing wellhead pressure values), wellhead temperature values (T w n) (e.g., including flowing wellhead temperature values), wellhead multiphase production rates (Q w n) over some or all of the life of the well system 106, and water cut data. In some embodiments, the measurement values are recorded in real-time, and are available for review or use within seconds, minutes, or hours of the condition being sensed (e.g., the measurements are available within one hour of the condition being sensed). In such an embodiment, the wellhead data 140 may be referred to as "real-time" wellhead data 140. Real-time wellhead data 140 may enable an operator of the well system 106 to assess a relatively current state of the well system 106, and make real-time decisions regarding development or management of the well system 106 and the reservoir 102, such as on-demand adjustments in regulation of production flow from the well. In some instances, the real-time decisions are performed automatically.

According to some example embodiments, the operation system 126 collects and records wireline log data 142 for the well system 106. The collecting of the wireline log data 142 may include continuous measurement of formation properties with electrically powered instruments to determine the properties of formation rock. The collected measurements may include electrical properties (e.g., resistivity and conductivity at various frequencies), sonic properties, active and passive nuclear measurements, dimensional measurements of the wellbore, formation fluid sampling, and formation pressure measurement. In some instances, to collect the wireline measurements, a logging tool is lowered into the open wellbore on a multiple conductor, contra-helically armored wireline cable. Once a tool string of the logging tool has reached the bottom of the interval of interest, measurements are taken on the way out of the wellbore. In certain example embodiments, the wireline logging tools include one or more sensors inserted in the wellbore 120 via a cable to measure certain rock properties at different depth points (e.g., every half a foot).

In some example embodiments, the operation system 126 also collects and records seismic data for a three-dimensional (3D) surface seismic survey. In some instances, vibrating trucks propagate sound waves into the ground, in an area of interest. The sound waves hit subsurface rock layers and reflect back to the surface, where surface sensors record such waves and their travel time. The surface sensors (e.g., recording devices or geophones) may be spread in a grid across the area of interest to provide exceptional areal coverage. A 3D survey (e.g., a 3D image or a 3D cube) of the subsurface may be generated based on the seismic data captured by the surface sensors.

In some embodiments, the well sub-surface system 122 includes casing installed in the wellbore 120. For example, the wellbore 120 may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore 120 to define a central passage that provides a conduit for the transport of tools and substances through the wellbore 120. For example, the central passage may provide a conduit for lowering logging tools into the wellbore 120, a conduit for the flow of production 121 (e.g., oil and gas) from the reservoir 102 to the surface 108, or a conduit for the flow of injection substances (e.g., water) from the surface 108 into the hydrocarbon-bearing formation 104. In some embodiments, the well sub-surface system 122 includes production tubing installed in the wellbore 120. The production tubing may provide a conduit for the transport of tools and substances through the wellbore 120. The production tubing may, for example, be disposed inside casing. In such an embodiment, the production tubing may provide a conduit for some or all of the production 121 (e.g., oil and gas) passing through the wellbore 120 and the casing.

In some embodiments, the well surface system 124 includes a wellhead 130. The wellhead 130 may include a rigid structure installed at the up-hole end of the wellbore 120, at or near where the wellbore 120 terminates at the Earth's surface 108. The wellhead 130 may include structures for supporting (or "hanging") casing and production tubing extending into the wellbore 120. Production 121 may flow through the wellhead 130, after exiting the wellbore 120 and the well sub-surface system 122, including, for example, the casing and the production tubing. In some embodiments, the well surface system 124 includes flow regulating devices that are operable to control the flow of substances into and out of the wellbore 120. For example, the well surface system 124 may include one or more production valves 132 that are operable to control the flow of production 134. A production valve 132 may be fully opened to enable unrestricted flow of production 121 from the wellbore 120. Further, the production valve 132 may be partially opened to partially restrict (or "throttle") the flow of production 121 from the wellbore 120. In addition, the production valve 132 may be fully closed to fully restrict (or "block") the flow of production 121 from the wellbore 120, and through the well surface system 124.

In some embodiments, the wellhead 130 includes a choke assembly. For example, the choke assembly may include hardware with functionality for opening and closing the fluid flow through pipes in the well system 106. Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke is taken out of service, the flow can be directed through another choke. In some embodiments, pressure valves and chokes are communicatively coupled to the operation system 126. Accordingly, the operation system 126 may obtain wellhead data regarding the choke assembly as well as transmit one or more commands to components within the choke assembly in order to adjust one or more choke assembly parameters.

Keeping with FIG. 1, in some embodiments, the well surface system 124 includes a surface sensing system 134. The surface sensing system 134 may include sensors for sensing characteristics of substances, including production 121, passing through or otherwise located in the well surface system 124. The characteristics may include, for example, pressure, temperature and flow rate of production 121 flowing through the wellhead 130, or other conduits of the well surface system 124, after exiting the wellbore 120. The surface sensing system 134 may also include sensors for sensing characteristics of the rig 101, such as bit depth, hole depth, drilling mudflow, hook load, rotary speed, etc.

In some embodiments, the surface sensing system 134 includes a surface pressure sensor 136 operable to sense the pressure of production 151 flowing through the well surface system 124, after it exits the wellbore 120. The surface pressure sensor 136 may include, for example, a wellhead pressure sensor that senses a pressure of production 121 flowing through or otherwise located in the wellhead 130. In some embodiments, the surface sensing system 134 includes a surface temperature sensor 138 operable to sense the temperature of production 151 flowing through the well surface system 124, after it exits the wellbore 120. The surface temperature sensor 138 may include, for example, a wellhead temperature sensor that senses a temperature of production 121 flowing through or otherwise located in the wellhead 130, referred to as "wellhead temperature" (T w h). In some embodiments, the surface sensing system 134 includes a flow rate sensor 139 operable to sense the flow rate of production 151 flowing through the well surface system 124, after it exits the wellbore 120. The flow rate sensor 139 may include hardware that senses a flow rate of production 121 (Q w h) passing through the wellhead 130. In some embodiments, downhole sensors and gauges are operable to capture production-related data (e.g., pressures, temperatures, etc.).

While FIG. 1 illustrates a configuration of components, other configurations may be used without departing from the scope of the disclosure. For example, various components in FIG. 1 may be combined to create a single component. As another example, the functionality performed by a single component may be performed by two or more components.

Figure 2:
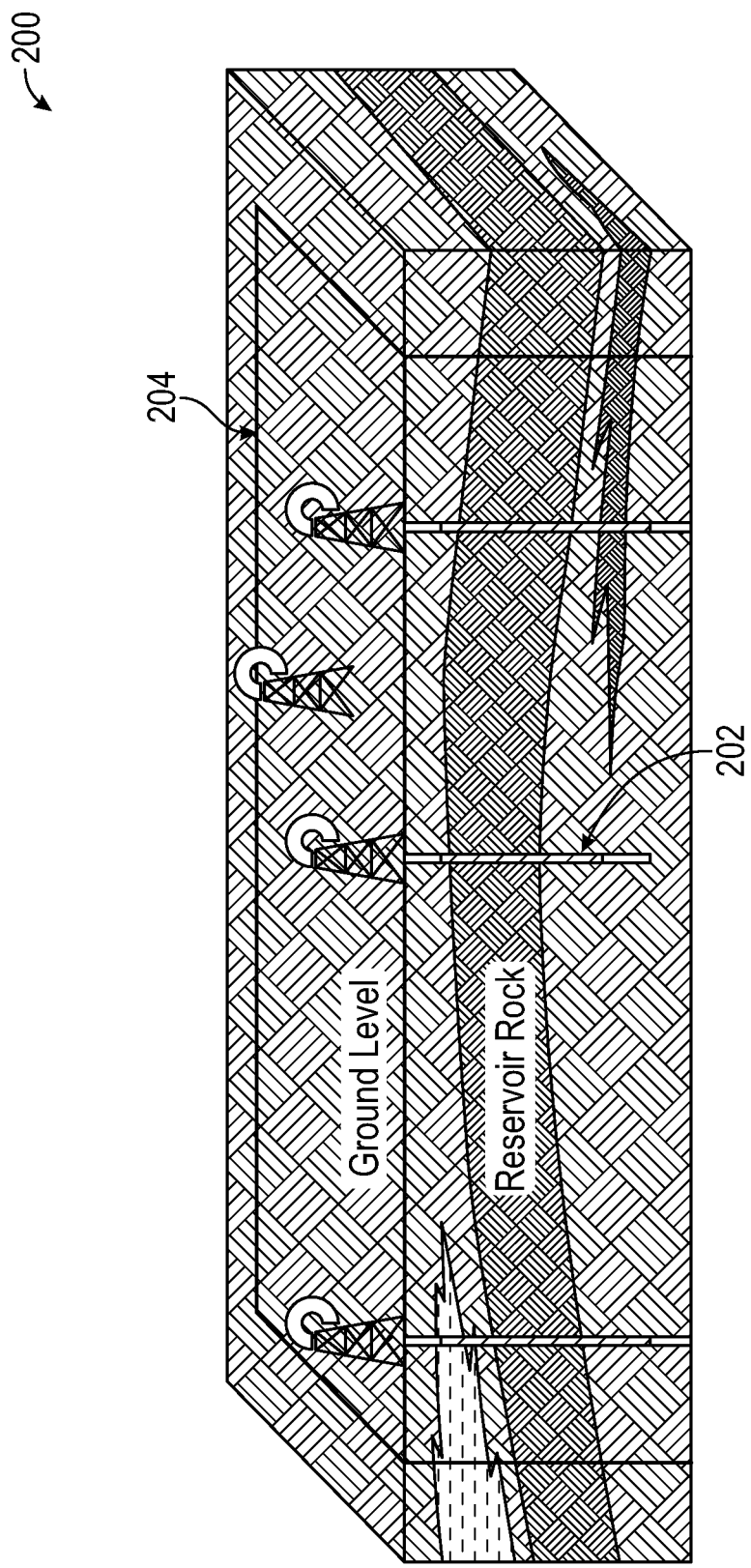
FIG. 2 is a diagram that illustrates sources of acquired data, according to one or more example embodiments.

FIG. 2 is a diagram that illustrates sources of acquired data, according to one or more example embodiments. As shown in FIG. 2, wireline log data is collected from one or more wells 202, as described above with respect to FIG. 1. In addition, FIG. 2 shows boundary 204 that encompasses the area of interest where seismic data is collected for generating a 3D seismic survey. Also, as shown in FIG. 2, the boundary 204 includes the one or more wells 202 from which the wireline log data is collected.

Figure 3:
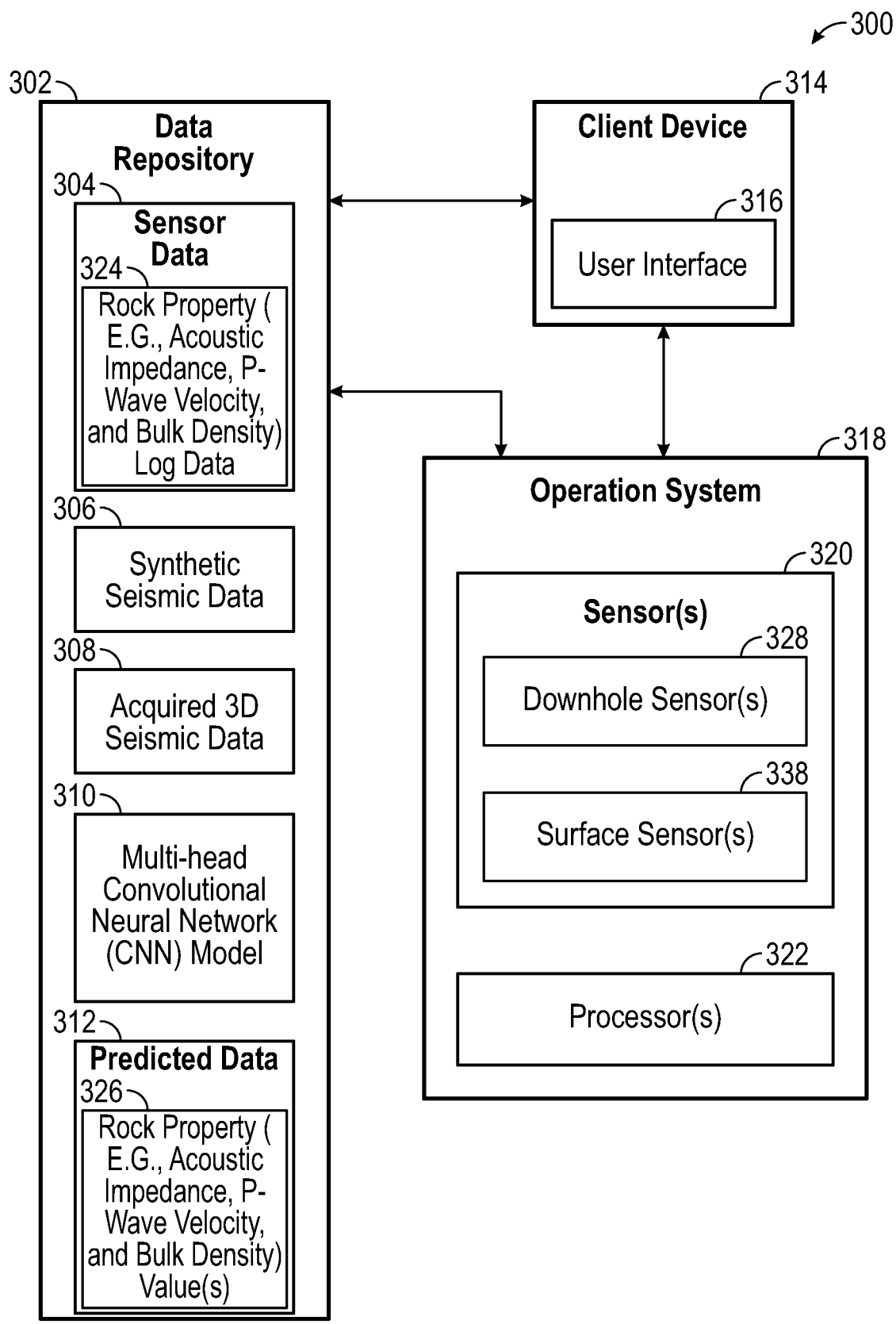
FIG. 3 is a block diagram that illustrates a system for estimating a rock property away from a well, according to one or more example embodiments.

FIG. 3 is a block diagram that illustrates a system 300 for estimating a rock property value away from a well, according to one or more example embodiments. System 300 includes an operation system 318, a data repository 302, and a client device 314. The operation system 318 is shown as including one or more sensors 320 and one or more processors 322. The one or more sensors 320, in some example embodiments, include one or more downhole sensors 328 arranged in a wellbore of a well to collect wireline log data associated with the well. The wireline log data may include measured rock properties at various depth points of drilled wells, such as gamma ray, compressional sonic, bulk density, and acoustic impedance. In some instances, the one or more downhole sensors 328 transmit the captured data to other parts of system 300 by wired or wireless communications. As shown in FIG. 2, the wireline log data may be stored as wireline log data 304 in the data repository 302.

In some instances, the one or more downhole sensors 328 store the acquired data in a memory for later transmittal to the surface. The memory may or may not be part of the one or more downhole sensors 328.

The one or more sensors 320 may also include one or more surface sensors 330 arranged on the surface of the ground, in an area of interest, to acquire 3D seismic data ("a 3D seismic survey"). The 3D seismic data includes sound wave data and travel time of sound waves that are propagated into the ground from the surface and that reflect off subsurface rock layers back to the surface where they are captured by the one or more surface sensors 330. Seismic traces from the 3D survey may be used as input, by a trained multi-head CNN model 310, to make predictions of reservoir properties in a zone away from the drilled wells. The multi-head CNN model 310 includes a plurality of heads, each including a kernel of a different size for determining spatial and temporal relationships of the captured 3D seismic data at different resolutions. The multi-head CNN model 310 is stored in the data repository 302. As shown in FIG. 2, the 3D seismic data captured by the one or more surface sensors 330 may be stored as acquired 3D seismic data 308 in the data repository 302.

The components of the operation system 318 are operatively connected and are configured to communicate with each other (e.g., via a bus, shared memory, a switch, wirelessly, etc.). In addition, the operation system 318 is configured to communicate with the data repository 302 to access and store data. Also, the operation system 318 is configured to communicate with the client device 314.

The one or more processors 322 are configured, in some example embodiments, to access the acquired 3D seismic data 308. The acquired 3D seismic data 308 includes seismic traces from a 3D seismic survey of an area of interest. The one or more processors 322 generates an estimated rock property value of a formation zone, away from the well, using a trained multi-head CNN model 310. The one or more processors 322 are also configured to update a drilling program for a production system based on the estimated rock property value. The drilling program may be executed on a computing device such as that shown in FIG. 10.

In some example embodiments, the one or more processors 322 are configured to generate synthetic seismic data based on the wireline log data 304 associated with the well, and to store it as synthetic seismic data 306 in the data repository 302. The synthetic seismic data 306 is used for training the multi-head CNN model 310.

According to certain example embodiments, the one or more processors 322 are configured to access the synthetic seismic data 306 for training the multi-head CNN model 310. The one or more processors 322 are also configured to access rock property log data 324 associated with the well for training the multi-head CNN model 310. The rock property log data 324 may be stored as a type of the wireline log data 304 in the data repository 302. The one or more processors 322 are further configured to train the multi-head CNN model to determine one or more relationships between the synthetic seismic data 306 and the rock property log data 324, and to output (or generate) an estimated impedance value 326 for a formation zone located away from the well. The outputting (or generating) of the estimated impedance value 326 is based on the one or more relationships between the synthetic seismic data 306 and the rock property log data 324. The estimated impedance value 326 may be stored as part of predicted data 312 in the data repository 302.

In various example embodiments, the one or more hardware processors 322 are further configured to generate a workorder based on the estimated rock property value 312. The one or more hardware processors 322 may also cause display of the workorder in a user interface 316 of a client device 314.

The operation system 318 is also configured to communicate with the client device 314 that includes the user interface 316. The client device 216 may include a computing device that includes at least a display and communication capabilities to communicate with the operation system 318, the data repository 302, and the production system via an electronic network. The client device 314 may comprise, but is not limited to, a computer, a work station, a desktop, a laptop, a tablet, a smart phone, a hand-held device, an Internet appliance, a wearable device, a smart phone, a cellular (or mobile) phone, a multi-processor system, a mini-computer, etc. The user interface 316 may be a graphical user interface (GUI) or a command line interface. The user interface 316 may display data retrieved, accessed, or received from the data repository 302, the operation system 318, and the production system on a display device, such as a computer monitor or a touchscreen on the client device 314. Furthermore, the user interface 316 may present data to a user, for example, through text or rendered by the client device 314 into a visual representation of the data, such as through visualizing a data model.

In some example embodiments, the operation system 318 generates a communication that references the estimated rock property value 312 and provides a recommendation of an action with respect to the estimated rock property value 312. The operation system 318 transmits the communication to the client device 314 and causes display of the communication in the user interface 316 of the client device 314.

In some example embodiments, the user of the client device 314 accesses the operation system 318 via the user interface 316. The client device 314 is also configured to communicate with the data repository 302 to access and store data. In addition, the client device 314 is also configured to communicate with the production system.

Figure 4:
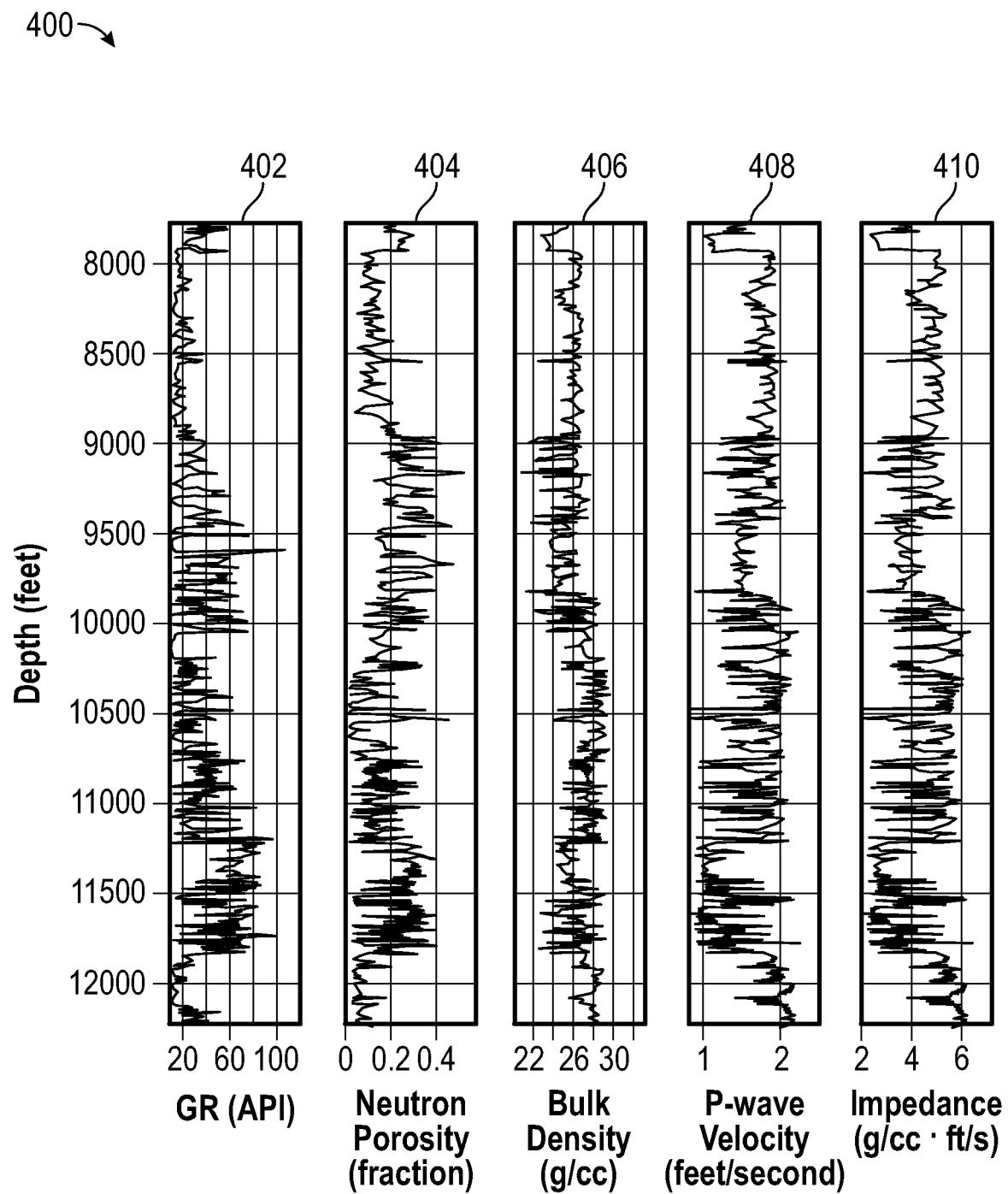
FIG. 4 illustrates representations of wireline logs of rock properties associated with a well, according to one or more example embodiments.

FIG. 4 illustrates representations of wireline logs of rock properties associated with a well, according to one or more example embodiments. Wireline logs provide measured rock properties at various depth points of a drilled well. The wireline logs may include gamma ray (GR) data, compressional sonic data, bulk density data, and acoustic impedance data. The wireline logs may be saved in a binary file of the LASer format (hereinafter also "a LAS file"). A LAS file stores the wireline logs for a particular well.

As shown in FIG. 4, the vertical axis of diagram 400 indicates the depth at which the various wireline log measurements have been obtained from a well. Further, the diagram 400 illustrates graphical representations (hereinafter also "graphs") of five rock properties. Graph 402 represents the GR data for the well, measured at a plurality of depths of the well. Graph 404 represents the neutron porosity data for the well, measured at the plurality of depths of the well. Graph 406 represents the bulk density data for the well, measured at the plurality of depths of the well. Graph 408 represents the P-wave velocity data for the well, obtained at the plurality of depths of the well. Graph 410 represents the acoustic impedance data for the well, obtained at the plurality of depths of the well. In some instances, the depth spacing interval is half a foot.

Figure 5:
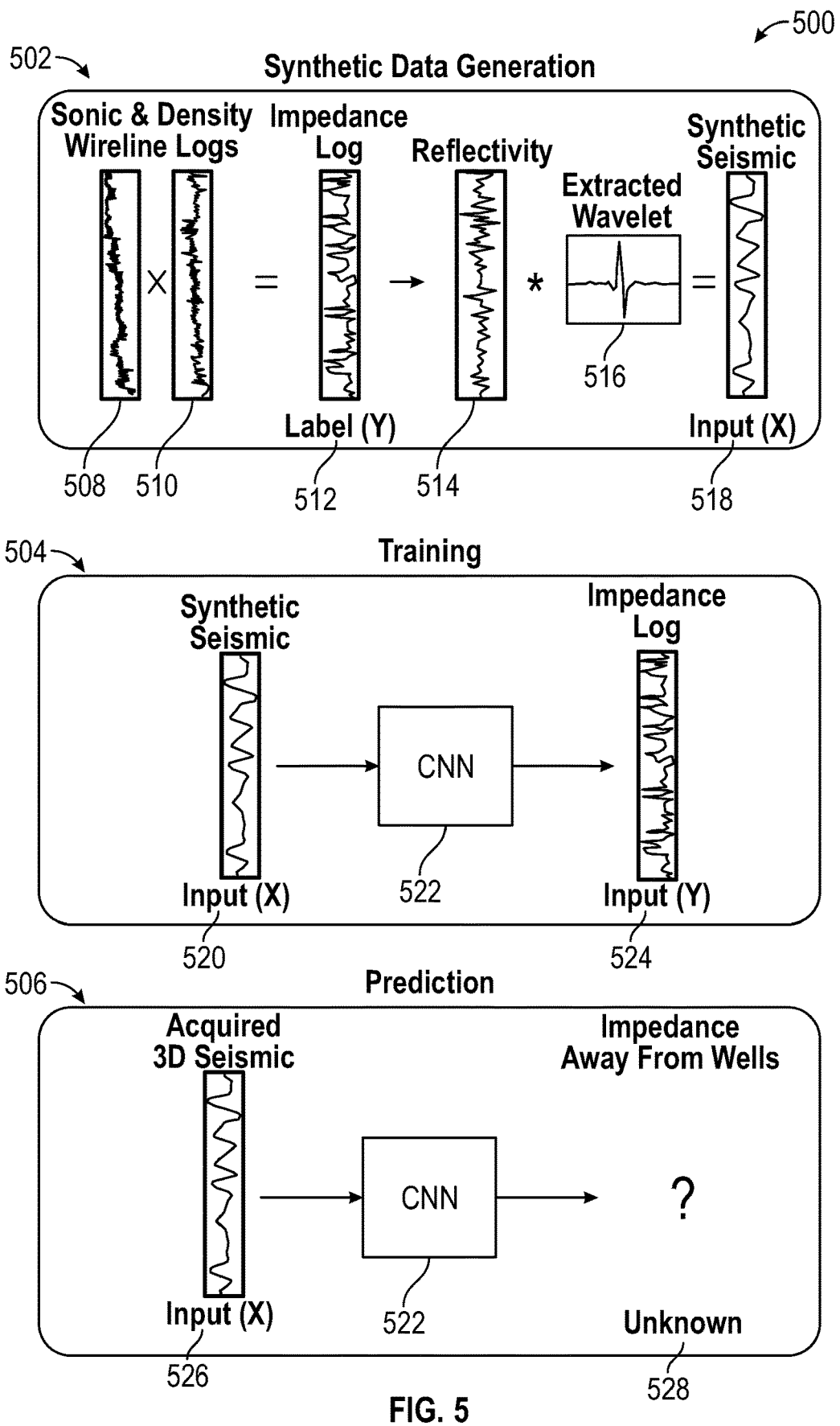
FIG. 5 is a flow diagram that illustrates an algorithm for training a multi-head Convolutional Neural Network (CNN) model to predict acoustic impedance values for formation zones located away from a well, according to one or more example embodiments.

FIG. 5 is a flow diagram that illustrates an algorithm 500 for training a multi-head CNN model to predict acoustic impedance values for formation zones located away from a well, according to one or more example embodiments. The operation system 318 trains the multi-head CNN model 522 to determine the signatures of subsurface rock properties from wireline logs of drilled wells and to link those signatures to seismic responses from a 3D seismic cube obtained from an area of interest that includes the drilled wells. The subsurface rock properties may include gamma ray, neutron porosity, resistivity, and acoustic impedance among others. Further, the operation system 318 uses the trained CNN model 522 to predict such subsurface rock properties between the drilled wells and over the 3D cube of a seismic survey.

Steps of the algorithm 500 may be performed using the components described above with respect to FIG. 3. One or more blocks in FIG. 5 may be performed by a computing system such as that shown and described below in FIG. 10.

At Step 502, a processor 322 generates synthetic seismic data 518. The generating of the synthetic seismic data 518 may, in some example embodiments, include computing an impedance $I_p$ log value 512. Impedance (i n) is a rock property expressed as the product of wave velocity (V) (i.e., the speed at which sound travels through the rock) and rock density (p), where $I_p=\rho V$. As shown in FIG. 5, the impedance $I_p$ log value 512 is determined by multiplying the time-converted P-wave velocity value 508 and the time-converted RHOB value 510. The impedance $I_p$ log value 512 may be given the label "Y."

Further, the generating of the synthetic seismic data 518 includes resampling $I_p$ to the sampling rate ($\delta t$) obtained from the 3D seismic cube (e.g., $\delta t=4$ milliseconds) and applying a low-pass filter to the impedance $I_p$ log of half the sampling frequency ($f_s$). For example, if $\Delta t=4$ ms, then $$f_s = \frac{1}{\delta t} = \frac{1}{0.004} = 250 \text{ Hz}.$$

That means frequencies higher than 125 Hz are filtered out.

The generating of the synthetic seismic data 518 may further include computing a reflectivity series 514. Assuming a flat interface between two thick, homogeneous layers, the ratio between the displacement amplitude of the reflected wave and that of the incident wave is called the normal incidence reflectivity for waves traveling from a first medium to a second medium, and is given by the following formula:

$$R_{12} = \frac{A_r}{A_i} = \frac{I_{p2} - I_{p1}}{I_{p2} + I_{p1}} = \frac{\rho_2 V_2 - \rho_1 V_1}{\rho_2 V_2 + \rho_1 V_1} \approx \frac{1}{2}\ln\left(\frac{I_{p2}}{I_{p1}}\right)$$

Further, the generating of the synthetic seismic data 518 includes convolving the reflectivity series 514 with the extracted wavelet 516 to generate synthetic seismic trace data 518 for the logged portion of the drilled well. Like the sampling rate ($\delta t$), the wavelet 516 is extracted from the 3D seismic cube. The synthetic seismic trace data 518 may be given the label "X." The processor 322 may repeat the above-mentioned synthetic data generation steps for all the logs in the training dataset and the testing dataset used to train and test the multi-head CNN model 522.

At Step 504, a processor 322 trains the multi-head CNN model 522 using the synthetic seismic traces 520, as input X, paired with a rock property log labeled Y (e.g., the acoustic impedance value 524) to determine the physical relationship between the rock property Y of the formation zone and the seismic response X of the formation zone. The trained multi-head CNN model may be used to predict a subsurface rock property as long as the rock property to be predicted is assigned the label "Y" in the training stage. In addition, the wireline logs used to train the multi-head CNN model 522 should be obtained from wells located within the boundary of the 3D seismic survey for which rock properties are estimated.

According to some example embodiments, the multi-head CNN model 522 is trained using training examples that include a plurality of "input trace X-label Y" pairs, i.e., the synthetically-generated seismic traces 520, used as input trace X, and the desired wireline log property, used as label Y. During training, data from the training dataset is fed in batches of thirty-two training examples at each iteration. Training is complete after two thousand epochs. An epoch is one pass through the training set.

In certain example embodiments, an optimization algorithm, such as the adaptive moment estimation method (ADAM), is used to iteratively update the trainable parameters of the multi-head CNN model in order to minimize the loss function (error). For example, the loss function is the mean squared error (MSE) between the label Y and the predicted parameter value.

In some example embodiments, the training of the multi-head CNN model is complete, once the loss function has dropped to an acceptable rate (e.g., is below an error threshold value). The predictive performance of the multi-head CNN model may be assessed by predicting the labels of the examples from a blind test dataset and computing some quantitative measures, such as the MSE or the Pearson correlation coefficient. If the error rate is determined to not exceed an error threshold value, the multi-head CNN model may be used for predicting the desired rock property. However, if the error rate is determined to exceed the error threshold value, the processor 322 performs further hyperparameter tuning or generates more training examples.

At Step 506, a processor 322 predicts reservoir rock properties for an area of interest where no well has been drilled yet, but 3D seismic coverage exists. The processor 322 feeds an acquired 3D seismic survey 526 to the trained multi-head CNN model 522 trace-by-trace as an input, and the multi-head CNN model 522 predicts the property it was trained on, for instance, an acoustic impedance value 528. Given that the synthetically-generated training examples (i.e., input traces 520 and labels 524) have the same sampling rate and wavelet as the acquired 3D seismic survey 526, the synthetic seismic traces should be similar to the seismic traces of the acquired 3D seismic survey 526. Hence, the multi-head CNN model 522 can estimate reservoir properties with similar quality to the properties measured by wireline logs (i.e., the same or near the high vertical resolution of logs).

Figure 6:
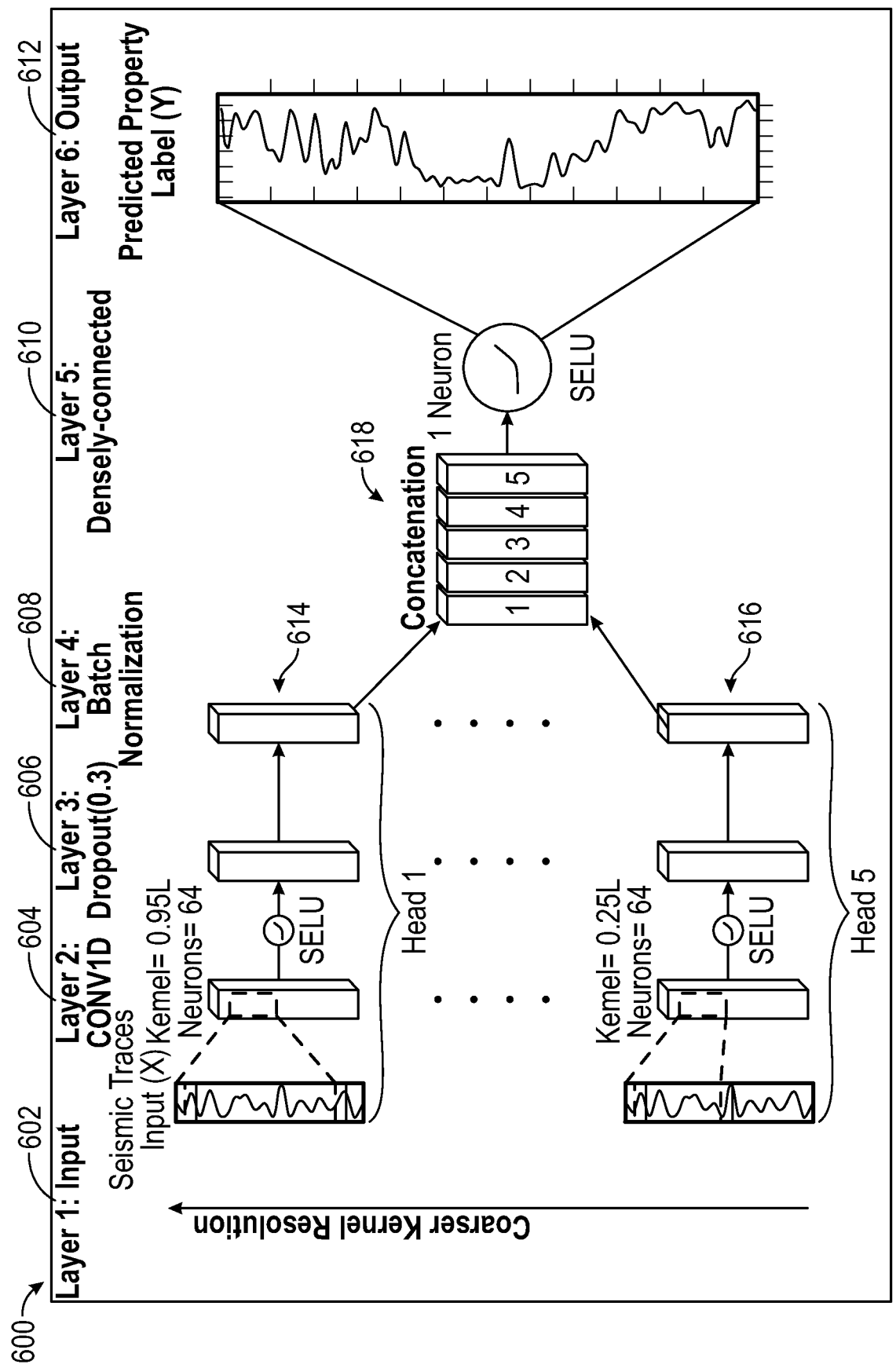
FIG. 6 is a flow diagram that illustrates an architecture of the multi-head CNN model, according to one or more example embodiments.

FIG. 6 is a flow diagram 600 that illustrates an architecture of the multi-head CNN model, according to one or more example embodiments. The term "multi-head" indicates that the input data is fed multiple times to the CNN model. For example, in FIG. 6, Head 1 is represented by item 614 and Head 5 is represented by item 616. Each head acts as an input channel with its own trainable parameters, that reads the input data at different resolutions. The difference between each head is the size of the kernel of a one-dimensional (1D) convolution in layer 2, which scans the input seismic trace. The multi-head CNN model includes a plurality (e.g., six) of layers. The output of a given layer is the input to its subsequent layer.

As shown in FIG. 6, at layer 1 (item 602), the multi-head CNN model accesses (e.g., receives) seismic traces as input. At layer 2 (item 604), the multi-head CNN model captures spatial and temporal relationships of input seismic data at different resolutions by using kernels of different sizes for the five heads of the CNN model. In some example embodiments, layer 2 is a 1D convolution (hereinafter also "CONV1D") layer that includes 64 neurons, a kernel of a particular size, a stride of one, and a nonlinear activation function. The kernel size varies for each head and is determined based on the average number of samples of the input traces (L). For example, if L=200 samples, then the 1D convolution kernel size of Head 1 is equal to 0.95*L=190 samples. Moreover, kernel sizes of heads 2, 3, 4, and 5 are 0.75 L, 0.625 L, 0.5 L, and 0.25 L, respectively. In addition, the scaled exponential linear unit (SELU) is specified as an activation function to the CONV1D layer.

At layer 3 (item 606), the multi-head CNN model drops out nodes at random to reduce overfitting of the training dataset. In some instances, the dropout is performed with a drop rate of 0.3.

At Layer 4 (item 608), the multi-head CNN model performs batch normalization and concatenation (item 618) of the output of the five heads. Layer 5 (item 610) is a densely-connected layer with one neuron. The nonlinear activation function at layer 5 is Scaled Exponential Linear Unit (SELU). At layer 6 (item 612), the multi-head CNN model performs the prediction of the output, i.e., the property label Y (e.g., the rock property value).

Figure 7:
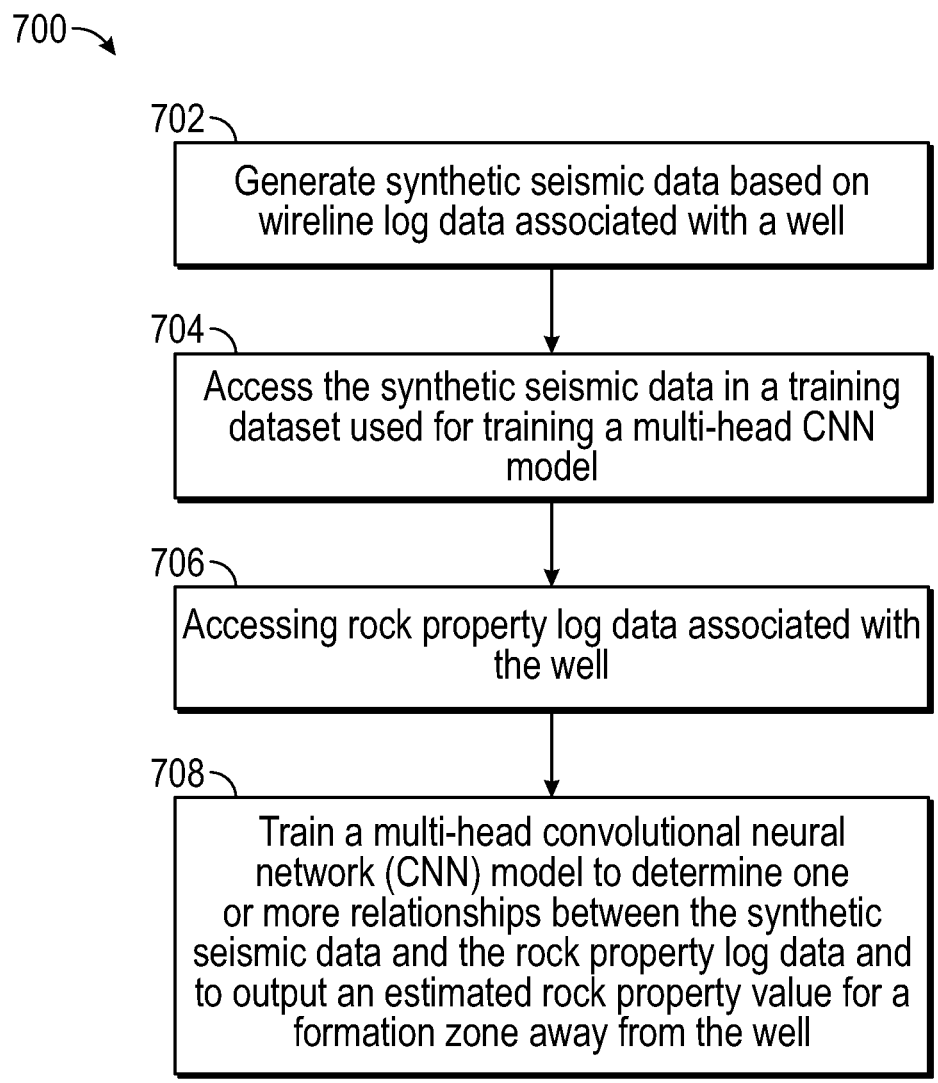
FIG. 7 is a flowchart illustrating operations of a system in performing a method for training the multi-head CNN model to predict rock property values for formation zones located away from the well, according to one or more example embodiments.

FIG. 7 is a flowchart illustrating operations of the operation system 318 in performing a method 700 for training the CNN model to predict rock property values for formation zones located away from the well. Steps of the method 700 may be performed using the components described above with respect to FIG. 3. One or more blocks in FIG. 7 may be performed by a computing system described below with respect to FIG. 10. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At Step 702, a processor 322 generates synthetic seismic data based on wireline log data associated with the well. The wireline log data associated with the well is acquired (e.g., collected or captured) by one or more downhole sensors 328 arranged in a wellbore of the well. The synthetic seismic data is used for training the multi-head CNN model. In some example embodiments, the synthetic seismic data includes one-dimensional synthetic seismic traces. The wireline log data may include compressional sonic data and bulk density data.

At Step 704, the processor 322 accesses the synthetic seismic data in a training dataset used for training the multi-head CNN model. The processor 322 may access the synthetic seismic data from the data repository 302.

At Step 706, the processor 322 accesses rock property log data associated with the well. The rock property log data may be included in the training dataset (or another training dataset) used for training the multi-head CNN model. The one or more processors 322 may access the rock property log data from the data repository 302.

At Step 708, the processor 322 trains the multi-head CNN model to determine one or more relationships between the synthetic seismic data and the rock property log data, and to output (or generate) an estimated rock property value for a formation zone located away from the well. The outputting of the estimated rock property value is based on the one or more relationships between the synthetic seismic data and the rock property log data.

In some example embodiments, the training of the multi-head CNN model includes generating one or more training examples based on the accessed synthetic seismic data and the accessed rock property log data. In some instances, the one or more training examples include one or more pairs comprising a synthetic seismic value and an rock property value. The one or more training examples may serve as basis for the determination of the one or more relationships between the synthetic seismic data and the rock property log data.

In some example embodiments, the multi-head CNN model includes a plurality of heads and a plurality of layers. Each head of the plurality of heads is an input channel that reads the acquired 3D seismic data at a different resolution per input channel. Further, each head includes a kernel of a different size in a 1D convolution layer of the plurality of layers. The plurality of kernels of various sizes facilitate the determining of spatial and temporal relationships of the captured 3D seismic data at different resolutions (or frequencies). In some instances, each head of the plurality of heads is associated with its own one or more trainable parameters.

According to some example embodiments, the plurality of layers includes six layers, and the output of a layer of the first five layers is an input to the subsequent layer. In certain example embodiments, a first layer of the plurality of layers receives the seismic traces as input. A second layer of the plurality of layers is the 1D convolution layer which scans the seismic traces. The second layer comprises sixty-four neurons, a kernel of a particular size, a stride of one, and a nonlinear activation function. A third layer of the plurality of layers performs a dropout procedure on one or more nodes of the multi-head CNN model at a drop rate of 0.3. A fourth layer of the plurality of layers performs a batch normalization and a concatenation of the output of the plurality of heads. A fifth layer of the plurality of layers is a densely-connected layer with one neuron. The nonlinear activation function at the fifth layer is SELU (Scaled Exponential Linear Unit). A sixth layer of the plurality of layers outputs the estimated rock property value. In some example embodiments, for a multi-head CNN model with five heads, the initial layers (layers 1 to 4) are repeated 5 times, and the outputs of the five heads are concatenated (merged) in the fifth layer.

In various example embodiments, the 3D seismic data includes primary arrival multiples values. The primary arrival multiples values are repeated arrivals of sound waves that keep bouncing between the earth's rock layers before arriving to the recording sensors at the surface. They are disguised as true reflection arrivals but are treated as contaminants (noise) and should be filtered out as much as possible during the data processing stage of the 3D seismic cube.

If primary arrival multiples are present in the acquired 3D seismic data but not in the synthetic seismic data used for training the CNN model, then the CNN model may treat this imaginary event as a real event. Therefore, the CNN model's predicted property may not resemble the true property but rather the property of the parent event which generated the multiple. The assumption is that all primary multiples are removed during the seismic data processing stage. However, unexpected results may manifest if multiples were not adequately removed during the processing stage.

Figure 8:
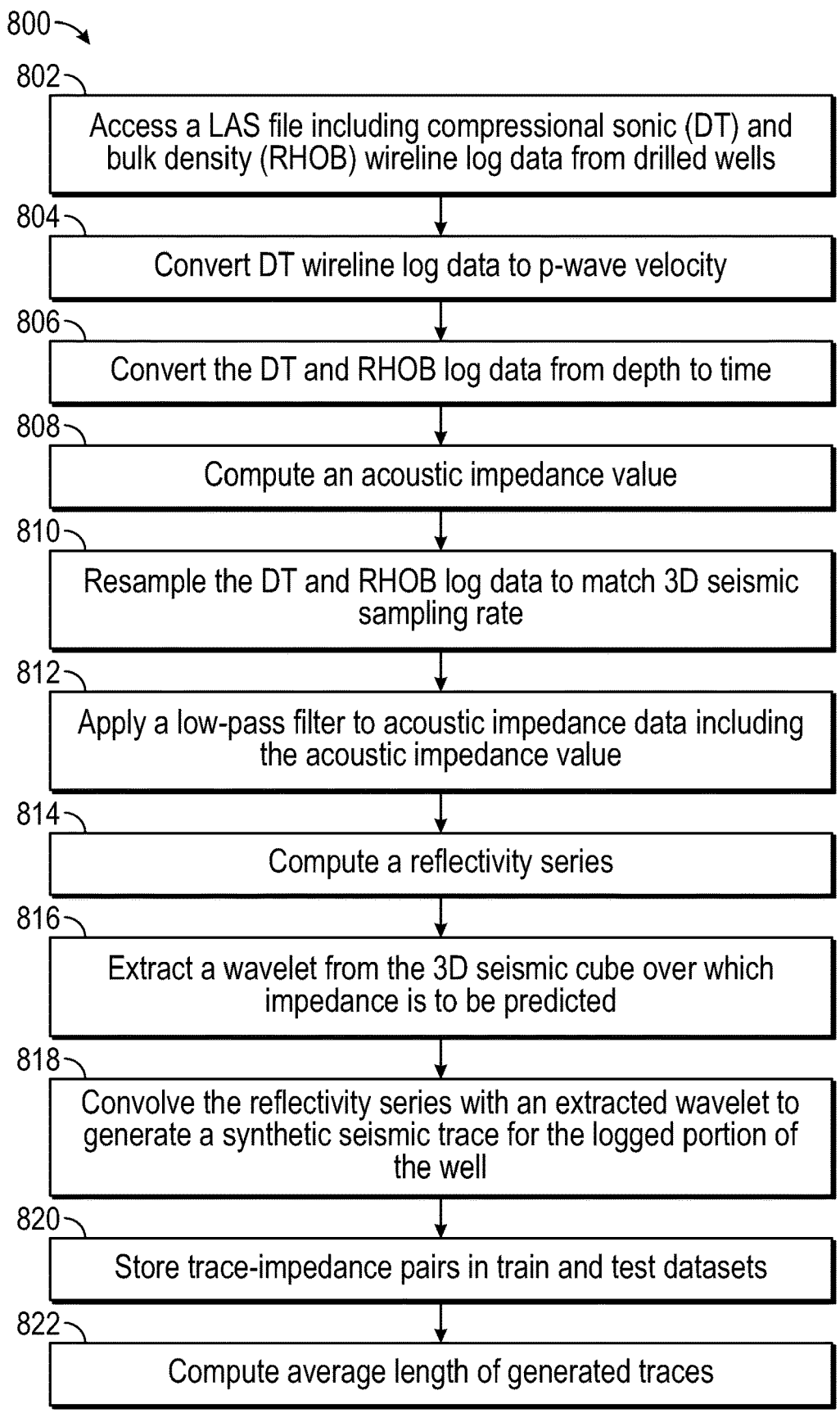
FIG. 8 is a flowchart illustrating operations of a system in performing a method for generating synthetic seismic data used in the training of the multi-head CNN model, according to one or more example embodiments.

FIG. 8 is a flowchart illustrating operations of the operation system 318 in performing a method 800 for generating synthetic seismic data used in the training of the CNN model, according to one or more example embodiments. Steps of the method 800 may be performed as part (e.g., a precursor task, a subroutine, or a portion) of Step 802 of FIG. 8, in which the processor 322 generates synthetic seismic data based on wireline log data associated with the well. Further, Steps of the method 800 may be performed using the components described above with respect to FIG. 2. One or more blocks in FIG. 8 may be performed by a computing system described below with respect to FIG. 10. While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At Step 802, a processor 322 accesses a LAS file including compressional sonic (DT) and bulk density (RHOB) wireline log data captured from drilled wells. The DT and RHOB data may be stored as wireline log data 304 in the data repository 302. The processor 322 may access DT and RHOB wireline log data from the data repository 302.

At Step 804, the processor 322 converts the DT wireline log data to V p (P-wave velocity) using this formula:

$$V_p = \frac{1}{DT} \times 10^6$$

where DT is the sonic log with measurement unit of microsecond per toot $$\left(\frac{us}{ft}\right),$$

and $V_p$ is the P-wave velocity with unit feet per second $$\left(\frac{ft}{s}\right).$$

At Step 806, the processor 322 converts the V p and RHOB wireline log data from depth to time, using the basic equation of motion:

$$\text{Time} = \frac{\text{distance}}{\text{Velocity}} = \frac{\text{depth}}{V_p}$$

Given that the depth of every sample in the wireline logs is known, the computed P-wave velocity is used to calculate the travel time. When converting the logs from depth to time domain, it may be assumed that the depth is monotonically increasing. Therefore, the logs are treated as vertical wells. In some instances, highly deviated or horizontal wells might result in erroneous predictions.

At Step 808, the processor 322 computes an acoustic impedance value. The acoustic impedance value ($I_p$) is the product of wave velocity (V) (i.e., the speed at which sound travels through the rock) and rock density ($\rho$), where $I_p=\rho V$.

At Step 810, the processor 322 re-samples the DT and RHOB wireline log data to match the 3D seismic sampling rate. The sampling rate is an intrinsic property of any signal recorded by a digital system. Given that the generated synthetic traces should mimic the recorded traces of the 3D seismic survey, the sampling rate for the synthetic seismic data should be chosen to be the same as the sampling rate of the recorded 3D survey. The sampling rate of the recorded 3D survey may be obtained from a Society of Exploration Geophysicists-Y (SEG-Y) file that stores the acquired seismic data. The SEG-Y file may include textual header information about survey parameters, such as survey dimensions, geographical location, sampling rate, etc. The sampling rate may be uses to re-sample the time-converted wireline logs to match the sampling rate of the 3D survey. For example, if the 3D seismic survey, over which properties are to be predicted, has a sampling rate of four milliseconds (ms), then the time-domain logs are re-sampled to four ms.

In some instances, generating synthetic traces from wireline logs re-sampled at more than just one sampling rate significantly improves the accuracy of the predicted property, by addressing the variation of frequency versus depth of propagating waves in the subsurface. Continuing with the previous example, if the 3D survey has a sampling rate of four ms, then synthetic traces could be generated using logs re-sampled to three, four, and five ms. This provides three slightly different representations for every synthetic trace, hence tripling the size of the training data set and addressing the inherit frequency variation in the 3D survey during prediction.

At Step 812, the processor 322 applies a low-pass filter to acoustic impedance data including the acoustic impedance value. The typical frequency content of surface seismic maxes out at about 60 Hz, whereas the frequency content of a wireline log can reach to about 200 Hz. This is due to wireline tools acquiring measurements every half a foot, while propagating sound waves averages tens of meters of rock properties. Since the maximum frequency of a wireline log (which can be obtained using a Fourier transformation) is significantly higher than that of surface seismic data, a low-pass frequency filter may be applied to remove very high frequencies from the wireline log to minimize the likelihood of prediction errors. This is due to the non-uniqueness issues of surface seismic data, where several arrangements of fine-scale rock properties could produce the same seismic response. In other words, the multi-head CNN model would have to estimate a fine-scale quantity (i.e., the wireline log) from a large-scale property (i.e., the surface seismic data), which may lead to more erroneous estimates.

At Step 814, the processor 322 computes a reflectivity series. Assuming a flat interface between two thick, homogeneous layers, the ratio between the displacement amplitude of the reflected wave and that of the incident wave is called the normal incidence reflectivity for waves traveling from the first medium to the second medium, and is given by the following formula:

$$R_{12} = \frac{A_r}{A_i} = \frac{I_{p2} - I_{p1}}{I_{p2} + I_{p1}} = \frac{\rho_2 V_2 - \rho_1 V_1}{\rho_2 V_2 + \rho_1 V_1} \approx \frac{1}{2}\ln\left(\frac{I_{p2}}{I_{p1}}\right).$$

At Step 816, the processor 322 extracts (or estimates) a wavelet from the 3D seismic cube over which the acoustic impedance value is to be predicted. To extract the wavelet, the spectral division method may be applied by dividing the Fourier transformation of the nearby trace by the Fourier transformation of the log-derived reflectivity, followed by applying an inverse Fourier transformation to the extract the wavelet.

At Step 818, the processor 322 convolves the reflectivity series with the extracted wavelet to generate a synthetic seismic trace for the logged portion of the well.

At Step 820, the processor 322 stores trace-impedance pairs in train and test datasets.

Figure 9:
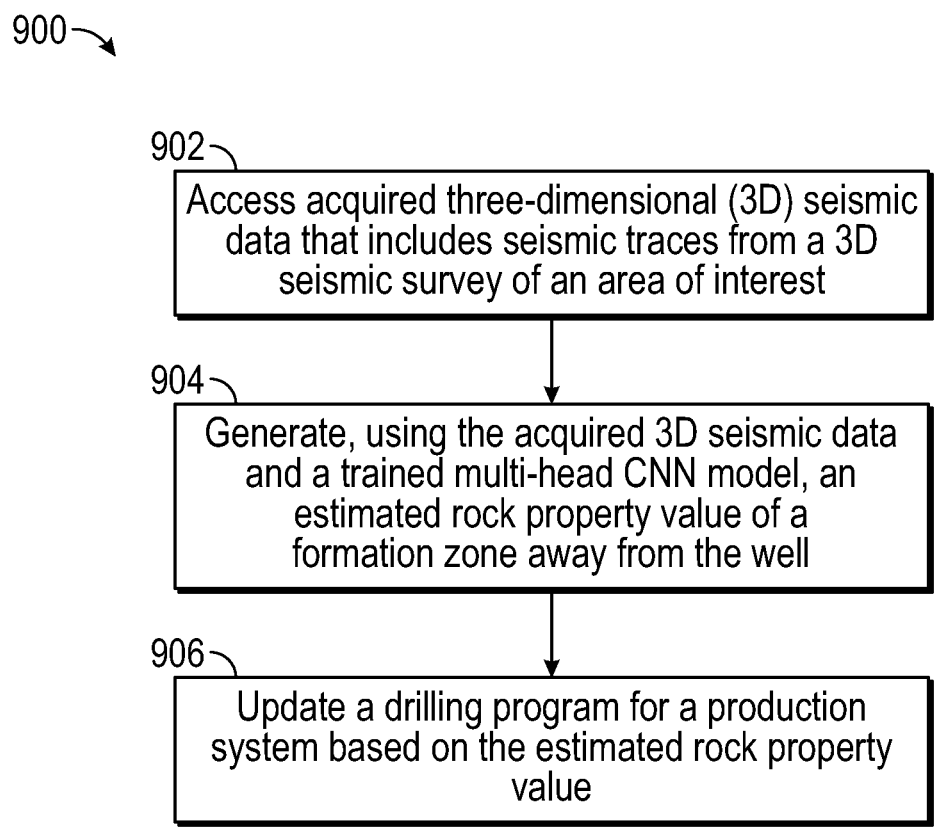
FIG. 9 is a flowchart illustrating operations of a system in performing a method for estimating rock property away from a well, according to one or more example embodiments.

FIG. 9 is a flowchart illustrating operations of the operation system 318 in performing a method for estimating a rock property (e.g., acoustic impedance) away from a well, according to one or more example embodiments. Steps of the method 900 may be performed using the components described above with respect to FIG. 3. One or more blocks in FIG. 9 may be performed by a computing system described below with respect to FIG. 10. While the various blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At Step 902, a processors 322 accesses acquired three-dimensional (3D) seismic data that includes seismic traces from a 3D seismic survey of an area of interest. The 3D seismic data is acquired (or collected) by one or more surface sensors 330 arranged on the surface of the ground, in an area of interest. In some instances, the 3D seismic data includes sound wave data and travel time of sound waves that are propagated into the ground from the surface and that reflect off subsurface rock layers back to the surface.

At Step 904, the processor 322 generates an estimated rock property value of a formation located zone away from the well. The generating is performed using the acquired 3D seismic data and a trained multi-head CNN model. In some example embodiments, the trained multi-head CNN model includes a plurality of heads and a plurality of layers. Each head of the plurality of heads is an input channel that reads the acquired 3D seismic data at a different resolution per input channel. Each head includes a kernel of a different size in the 1D convolution layer of the plurality of layers.

At Step 904, the processor 322 updates a drilling program for a production system based on the estimated rock property value. In certain example embodiments, the updating of the drilling program, by the processor 322, includes generating an instruction to proceed drilling in the area of interest based on the estimated rock property value, and executing the generated instruction.

In some example embodiments, the processor 322 is further configured to generate a workorder based on the estimated rock property value, and to cause display of the workorder in a user interface of a client device.

In some example embodiments, the updating of the drilling program, by the processor 322, includes generating a workorder based on the estimated rock property value, and causing display of the workorder in a user interface of a client device.

Figure 10:
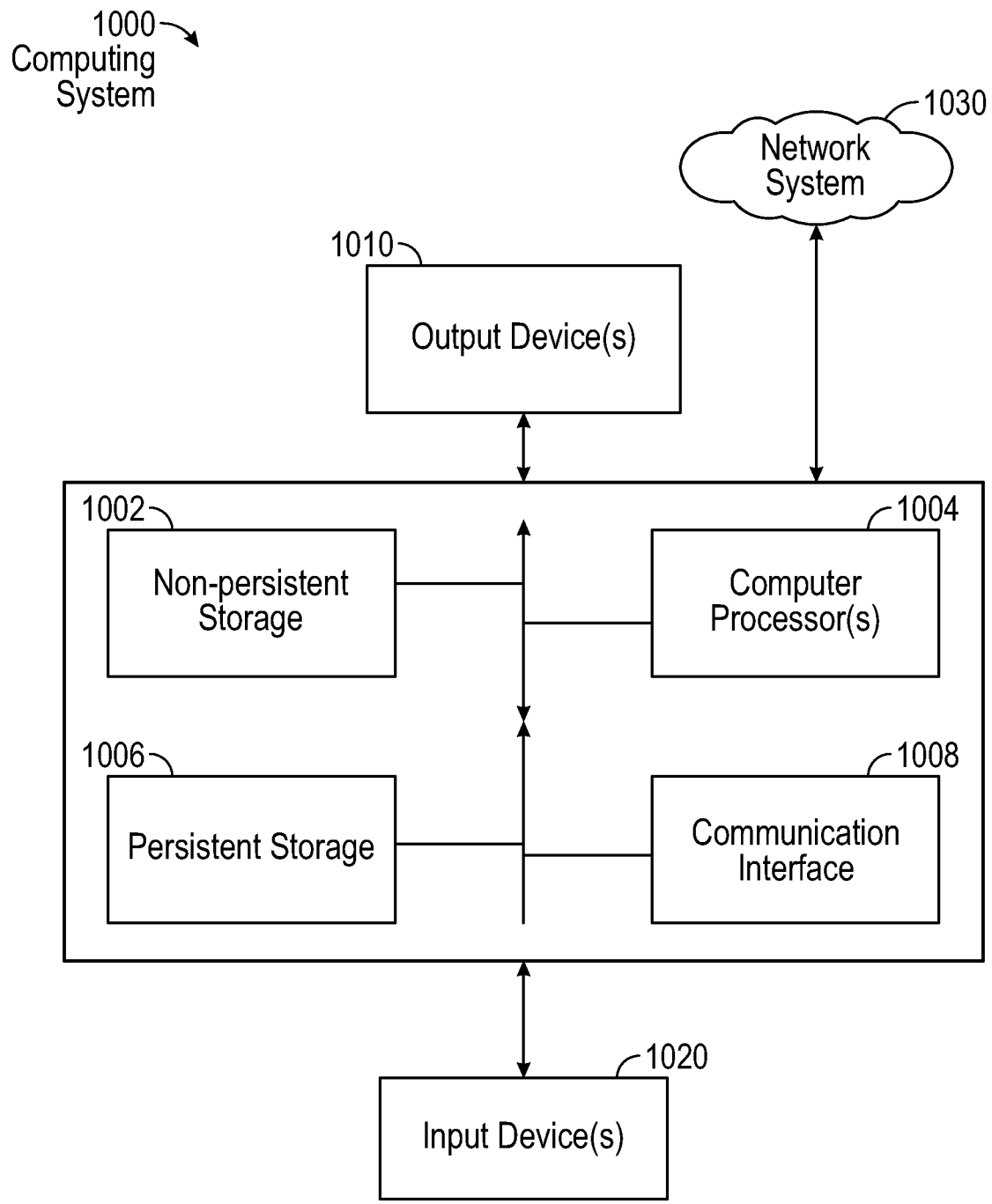
FIG. 10 illustrates a computing system, according to one or more example embodiments.

Turning to FIG. 10, FIG. 10 shows a computing system in accordance with one or more embodiments. As shown in FIG. 10, the computing system 1000 may include one or more computer processor(s) 1004, non-persistent storage 1002 (e.g., random access memory (RAM), cache memory, or flash memory), persistent storage 1006 (e.g., a hard disk), a communication interface 1008 (e.g., transmitters and/or receivers), as well as other elements. The computer processor(s) 1004 may be an integrated circuit for processing instructions. The computing system 1000 may also include one or more input device(s) 1020, such as a touchscreen, a keyboard, a mouse, a microphone, a touchpad, an electronic pen, or any other type of input device. In some embodiments, the one or more input device(s) 1020 may be a graphical user interface (GUI). Further, the computing system 1000 may include one or more output device(s) 1010, such as a screen (e.g., a liquid crystal display (LCD), a plasma display, or a touchscreen), a printer, external storage, or any other output device. One or more of the output device(s) 1010 may be the same or different from the input device(s) 1020. The computing system 1000 may be connected to a network system 1030 (e.g., a local area network (LAN), a wide area network (WAN) such as the Internet, a mobile network, or any other type of network) via a network interface connection.

In one or more embodiments, for example, the input device 1020 may be coupled to a receiver and a transmitter used for exchanging communications with one or more peripherals connected to the network system 1030. The transmitter may relay information received by the receiver to other elements of the computing system 1000. Further, the computer processor(s) 1004 may be configured for performing or aiding in implementing the processes described in reference to FIGS. 1-9.

Further, one or more elements of the computing system 1000 may be located at a remote location and may be connected to the other elements over the network system 1030. The network system 1030 may be a cloud-based interface that performs processing at a remote location, away from the well site, and that is connected to the other elements over a network. In this case, the computing system 1000 may be connected through a remote connection established using a 5G connection, such as protocols established in Release 15 and subsequent releases of the 3GPP/New Radio (NR) standards.

The computing system of FIG. 10 may include or may be connected to a data repository. The data repository may be a database. A database is a collection of information configured for ease of data retrieval, modification, re-organization, and deletion. In some embodiments, the database includes measured data relating to the methods, the systems, and the devices as described in reference to FIGS. 1-9.

While FIGS. 1-10 show various configurations of components, other configurations may be used without departing from the scope of the disclosure. For example, various components may be combined to create a single component. As another example, the functionality performed by a single component may be performed by two or more components.

Although only a few example embodiments have been described in detail above, those skilled in the art will readily appreciate that many modifications are possible in the example embodiments without materially departing from this description. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112(f) for any limitations of any of the claims herein, except for those in which the claim expressly uses the words "means for" together with an associated function.

What is claimed:

1. A system for drilling a new well in a subterranean formation by estimating a rock property away from a drilled well, the system comprising:
   one or more hardware processors configured to access acquired three-dimensional (3D) seismic data that includes seismic traces from a 3D seismic survey of an area of interest;
   a multi-head Convolutional Neural Network (CNN) model including a plurality of kernels of various sizes for determining spatial and temporal relationships of the acquired 3D seismic data at different resolutions, the multi-head CNN model being trained to generate an estimated rock property value of a formation zone away from the drilled well and included in the area of interest; and
   a rig for drilling the new well in the area of interest and according to a drilling program for a production system,
   wherein the multi-head CNN model includes a plurality of heads and a plurality of layers,
   wherein each head of the plurality of heads is an input channel that reads the acquired 3D seismic data at a different resolution per input channel,
   wherein each head includes a kernel of a different size in a one-dimensional (1D) convolution layer of the plurality of layers,
   wherein a first layer of the plurality of layers receives the seismic traces as input,
   wherein a second layer of the plurality of layers is the 1D convolution layer which scans the seismic traces, the second layer comprising sixty-four neurons, a kernel of a particular size, a stride of one, and a nonlinear activation function,
   wherein a third layer of the plurality of layers performs a dropout procedure on one or more nodes of the multi-head CNN model at a drop rate of 0.3,
   wherein a fourth layer of the plurality of layers performs a batch normalization and a concatenation of the output of the plurality of heads,
   wherein a fifth layer of the plurality of layers is a densely-connected layer with one neuron,
   wherein a sixth layer of the plurality of layers outputs the estimated rock property value,
   wherein the one or more hardware processors are further configured to update the drilling program for the production system based on the estimated rock property value, the drilling program being executed on a computing device of the production system.

2. The system of claim 1, wherein each head of the plurality of heads is associated with its own one or more trainable parameters.

3. The system of claim 1,
   wherein the plurality of layers includes six layers, and
   wherein the output of a layer of the first five layers is an input to the subsequent layer.

4. The system of claim 1, wherein the one or more hardware processors are configured to:
   generate synthetic seismic data based on wireline log data associated with the drilled well, the synthetic seismic data being used for training the multi-head CNN model.

5. The system of claim 4, wherein the one or more hardware processors are configured to:
   access synthetic seismic data in a training dataset used for training the multi-head CNN model;
   access rock property log data associated with the drilled well; and
   train the multi-head CNN model to:
      determine one or more relationships between the synthetic seismic data and the rock property log data; and
      output an estimated rock property value for a formation zone away from the drilled well based on the one or more relationships between the synthetic seismic data and the rock property log data.

6. The system of claim 4, wherein the synthetic seismic data includes one-dimensional synthetic seismic traces, and
   wherein the wireline log data include compressional sonic data and bulk density data.

7. The system of claim 1, further comprising:
   one or more surface sensors arranged on the surface of the ground, in the area of interest, and are configured to acquire the 3D seismic data, and
   wherein the 3D seismic data includes sound wave data and travel time of sound waves that are propagated into the ground from the surface and that reflect off subsurface rock layers back to the surface.

8. The system of claim 1, further comprising:
   one or more downhole sensors arranged in a wellbore of the drilled well and configured to collect wireline log data associated with the drilled well.

9. The system of claim 1, wherein the one or more hardware processors are further configured to:
   generate a workorder based on the estimated rock property value; and
   cause display of the workorder in a user interface of a client device.

10. The system of claim 1, wherein the rock property includes acoustic impedance.

11. A method for drilling a new well in a subterranean formation by estimating a rock property away from a well, the method comprising:
   accessing acquired three-dimensional (3D) seismic data that includes seismic traces from a 3D seismic survey of an area of interest;
   generating an estimated rock property value of a formation zone away from a drilled well and included in the area of interest the generating being performed using one or more hardware processors, the acquired 3D seismic data, and a trained multi-head Convolutional Neural Network (CNN) model including a plurality of kernels of various sizes for determining spatial and temporal relationships of the acquired 3D seismic data at different resolutions;

updating a drilling program for a production system based on the estimated rock property value; and drilling the new well in the area of interest and according to the drilling program, wherein the multi-head CNN model includes a plurality of heads and a plurality of layers, wherein each head of the plurality of heads is an input channel that reads the acquired 3D seismic data at a different resolution per input channel, wherein each head includes a kernel of a different size in a one-dimensional (1D) convolution layer of the plurality of layers, wherein a first layer of the plurality of layers receives the seismic traces as input, wherein a second layer of the plurality of layers is the 1D convolution layer which scans the seismic traces, the second layer comprising sixty-four neurons, a kernel of a particular size, a stride of one, and a nonlinear activation function, wherein a third layer of the plurality of layers performs a dropout procedure on one or more nodes of the multi-head CNN model at a drop rate of 0.3, wherein a fourth layer of the plurality of layers performs a batch normalization and a concatenation of the output of the plurality of heads, wherein a fifth layer of the plurality of layers is a densely-connected layer with one neuron, wherein a sixth layer of the plurality of layers outputs the estimated rock property value.

12. A method for drilling a new well in a subterranean formation by training a multi-head Convolutional Neural Network (CNN) model to estimate a rock property away from a drilled well, the method comprising:

accessing synthetic seismic data in a training dataset used for training the multi-head CNN model;

accessing rock property log data associated with the drilled well;

training the multi-head CNN model to:
determine one or more relationships between the synthetic seismic data and the rock property log data; and output an estimated rock property value for a formation zone away from the drilled well based on the one or more relationships between the synthetic seismic data and the rock property log data;

updating a drilling program for a production system based on the estimated rock property value; and drilling the new well in the area of interest and according to the drilling program, wherein the multi-head CNN model includes a plurality of heads and a plurality of layers, wherein each head of the plurality of heads is an input channel that reads the acquired 3D seismic data at a different resolution per input channel, and wherein each head includes a kernel of a different size in a one-dimensional (1D) convolution layer of the plurality of layers, wherein a first layer of the plurality of layers receives the seismic traces as input, wherein a second layer of the plurality of layers is the 1D convolution layer which scans the seismic traces, the second layer comprising sixty-four neurons, a kernel of a particular size, a stride of one, and a nonlinear activation function;

wherein a third layer of the plurality of layers performs a dropout procedure on one or more nodes of the multi-head CNN model at a drop rate of 0.3;

wherein a fourth layer of the plurality of layers performs a batch normalization and a concatenation of the output of the plurality of heads;

wherein a fifth layer of the plurality of layers is a densely-connected layer with one neuron; and wherein a sixth layer of the plurality of layers outputs the estimated rock property value.

13. The method of claim 12, further comprising:
generating the synthetic seismic data based on wireline log data associated with the drilled well.

14. The method of claim 12, wherein each head of the plurality of heads is associated with its own one or more trainable parameters.

15. The method of claim 12,
wherein the plurality of layers includes six layers, and
wherein the output of a layer of the first five layers is an input to the subsequent layer.

* * * * *